No. 715,015. Patented Dec. 2, 1902.
C. BUSH.
SPRING SUPPORT FOR UPHOLSTERY.
(Application filed Mar. 28, 1902.)
(No Model.) 2 Sheets—Sheet 1.
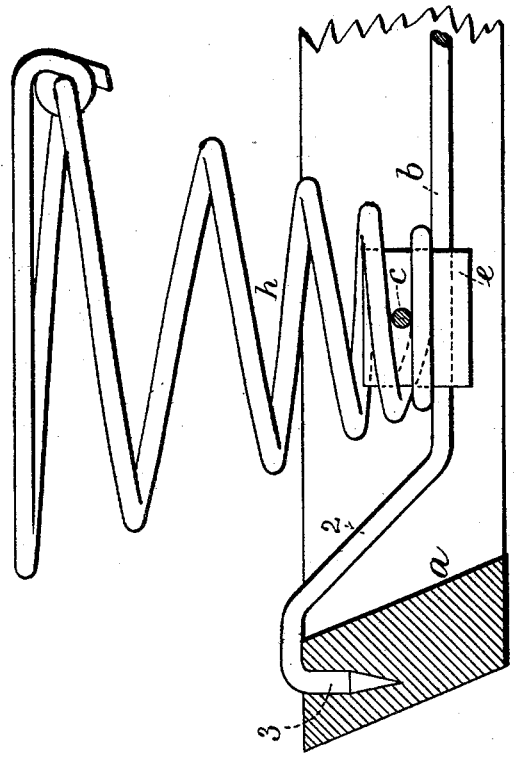
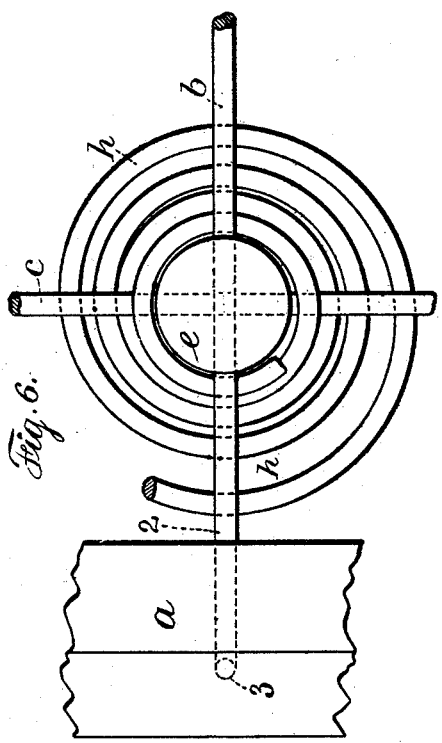
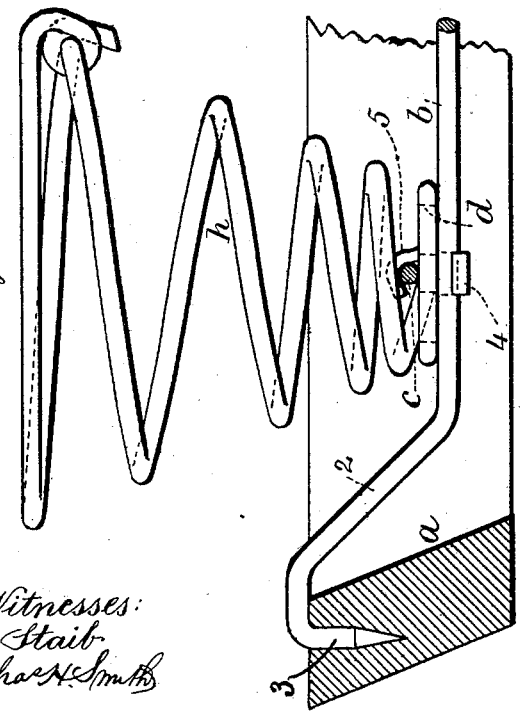
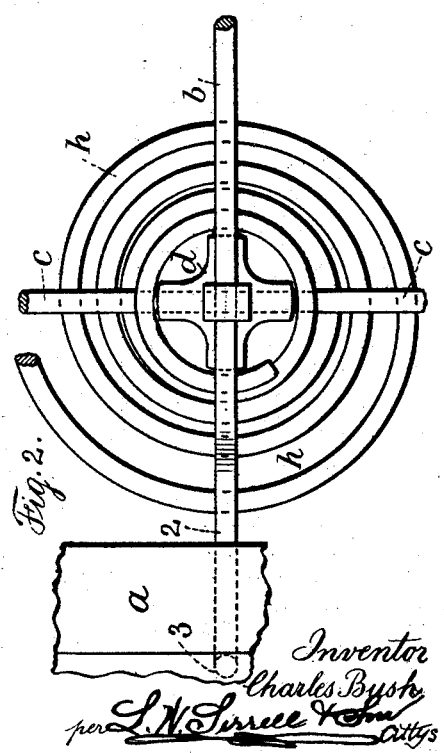

No. 715,015. Patented Dec. 2, 1902.
C. BUSH.
SPRING SUPPORT FOR UPHOLSTERY.
(Application filed Mar. 28, 1902.)
(No Model.) 2 Sheets—Sheet 2.
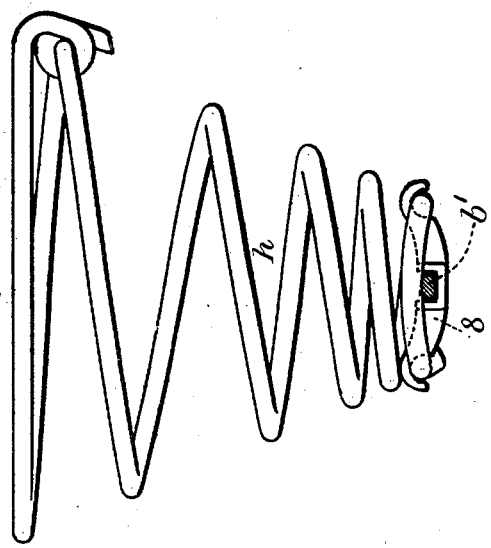
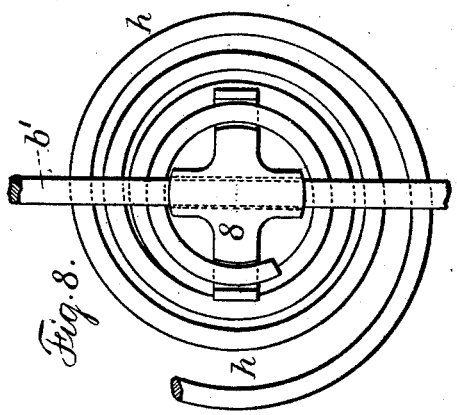
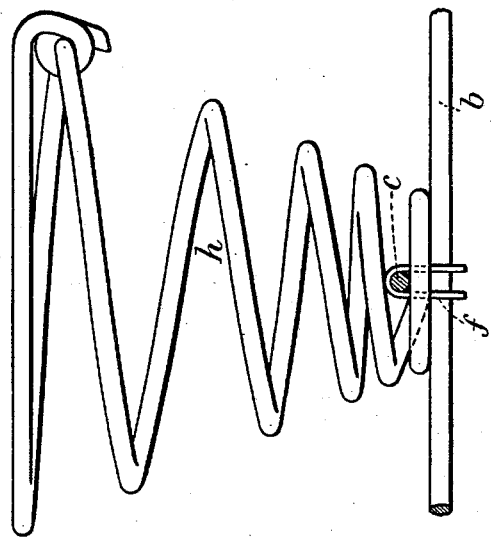
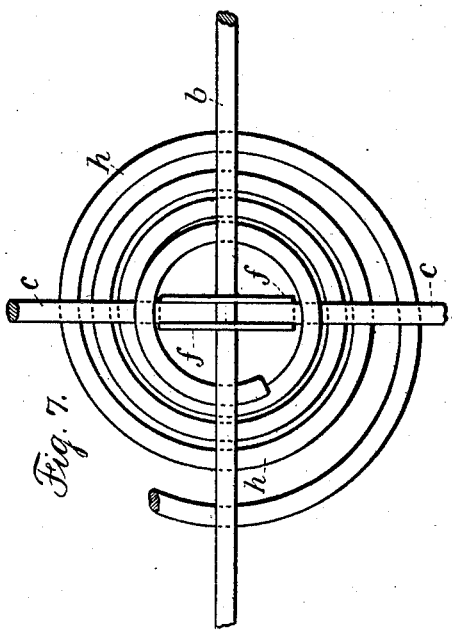
Witnesses:
J. Staib
Chas H. Smith
Inventor
Charles Bush
per L. W. Serrell & Son Attys

UNITED STATES PATENT OFFICE.

CHARLES BUSH, OF NEWBURGH, NEW YORK, ASSIGNOR TO THE STAPLES AND HANFORD COMPANY, OF NEWBURGH, NEW YORK, A CORPORATION OF NEW YORK.

SPRING-SUPPORT FOR UPHOLSTERY.

SPECIFICATION forming part of Letters Patent No. 715,015, dated December 2, 1902.

Application filed March 28, 1902. Serial No. 100,365. (No model.)

*To all whom it may concern:*

Be it known that I, CHARLES BUSH, a citizen of the United States, residing at Newburgh, in the county of Orange and State of New York, have invented an Improvement in Spring-Supports for Upholstery, of which the following is a specification.

My invention relates to spring-supports for upholstery, and particularly to springs of inverted conical or spiral form connected to and supported upon a wire or crossing wires; and the object of my invention is to securely fasten and lock the base of the springs to such part or parts, so that there will be no slipping or shifting of the one with reference to the other and the spring be so firmly supported that tying-cords at the top may be dispensed with.

In carrying out my invention I employ a clip or key-block of a form of metal, which is securely connected to the supporting-wire or the crossing supporting-wires by the lower convolution of the spring, parts of which pass between the parts of said clip and supporting-wire or between the diameters of the crossing wires, the said clip or key-block being of a diameter substantially agreeing with the inner diameter of the smaller convolutions of the spring, having the functional effect of centering the spring upon its support. The structure to which I give preference comprises a clip or key-block in the form of a plate of metal of substantially the thickness of the wire of the inverted spiral spring and crossing wires, one or both of which form supports, said clip or key-block agreeing substantially in diameter with the inner diameter of the smaller convolution, and said convolution occupying a position between the diameters of the crossing wires—that is to say, occupying a position above one wire and beneath the other—this clip or key-block being provided with integral lugs bent over upon the crossing wires, which lie against opposite faces thereof and in opposite directions.

In the drawings, Figure 1 is an elevation and partial section representing the preferred form of my invention. Fig. 2 is an inverted plan of the same. Figs. 3, 4, and 5 are elevations of modified forms of my invention, and Figs. 6, 7, and 8 inverted plans of the said modified forms.

With reference to Figs. 1 and 2, $a$ indicates a supporting-bar, the same preferably representing a member of a frame of an article of furniture, which, as an illustration, might be part of a seat-frame, part of a sofa-frame, or part of the frame of a spring-bed. $b$ represents supporting-wires, and $c$ crossing wires, which crossing wires may or may not also be supporting-wires. The supporting-wires are preferably formed in accordance with the structure shown and described in Letters Patent granted to John A. Staples May 10, 1892, No. 474,536; September 20, 1892, No. 482,908, and March 6, 1894, No. 516,030, and in which structure 2 represents the bent end of the wire, and 3 the downwardly projecting and pointed end adapted to be driven into the bar $a$, said supporting-wire, with its end, being received within the opening formed by the respective members or bars of the supporting-frame. $d$ represents a clip or key-block comprising a plate of metal of substantially the thickness of the wire of the spring $h$, which spring is of inverted conical or spiral form. This clip or key-block $d$ is preferably provided upon opposite sides and extending in opposite directions with central integral lugs 4 5, and said block $d$ is of a diameter agreeing substantially with the inner diameter of the smaller convolutions of said spring $h$, the plate, as shown, having four equidistant extensions or arms. As shown in Figs. 1 and 2, the supporting-wire $b$ lies against the under surface of the block $d$ and the crossing wire against the upper surface, the lug 4 being bent into gripping contact with the wire $b$ and the lug 5 over the wire $c$ to hold said wires firmly to said clip or key-block. In this structure the coil of the spring—that is, the smaller and lower convolution—is screwed about the clip or key-block and between the diameters of the crossing wires, thus locking the base of the spring firmly in place to the crossing wires and centering the same in position by the said clip or key-block lying within the convolution. In this structure the spring cannot slip in either direction, nor can the wires move with reference to one another, and the base of the spring is so firmly held and centered that the usual tying-cords are almost unnecessary.

In the structure shown in Figs. 3 and 6 the clip or key-block e is in the form of a cylindrical section, with transverse holes at right angles to one another and separated in horizontal planes by substantially the diameter of the wire of the spring, the diameter of the clip or key-block agreeing substantially with the inner diameter of the smaller convolution of the spring, and in this modified form the coil of the spring is screwed around the block e, with the parts of the convolutions coming above and beneath, or, in other words, between the respective crossing wires, the convolution being put under tension in said structure, so as to form a frictional grip on the crossing wires, which frictional grip is also manifest in the structures shown in Figs. 1 and 2.

In the modified form of my invention shown in Figs. 4 and 7 f represents a clip or key-plate of sheet metal of yoke shape which in length agrees substantially with the inner diameter of the smaller convolution of the spring, one crossing wire passing through within the bent portion of the plate and the other wire at right angles thereto passing through holes in said plate and the wires separated in their horizontal planes a distance substantially agreeing with the diameter of the wire of the spring and the convolution passing beneath the one and above the other, tension being applied in the act of connecting the parts to form a frictional hold, as hereinbefore stated.

In the modified form of the invention shown in Figs. 5 and 8 the spring is connected to and supported upon a single flattened wire, the clip or key-block being of the form of an X-plate or crossing arms with channels in opposite faces, one channel being central and receiving the supporting-wire b' and the channels in the opposite face being in lugs at the respective ends and receiving the wire at opposite sides of the convolutions. In this instance the coil of wire is screwed around the block 8, and a frictional tension is applied not only to forcefully hold the spring to the block but the wire to the block, the convolutions passing under the block and over the wire.

I claim as my invention—

1. In spring-supports for upholstery, the combination with the inverted conical or spiral springs and a supporting-wire, of a clip or key-block device extending along across and engaging the supporting-wire and coming substantially within the plane and limits of the lower convolution of the spring and with which device and the supporting-wire the lower convolution of the spring is brought into forceful frictional contact under tension so as to lock the respective parts in a fixed position, substantially as set forth.

2. In spring-supports for upholstery, the combination with the inverted conical or spiral springs and a supporting-wire, of a clip or key-block device adapted to be connected to the supporting-wire and in diameter agreeing substantially with the inner diameter of the smaller convolution of the spring and received within the limits of the convolution and with which device and wire the lower convolution of the spring is brought into forceful frictional relation under tension by passing over the one and under the other, substantially as specified.

3. In spring-supports for upholstery, the combination with the inverted conical or spiral springs, and a supporting-wire, of a crossing wire at right angles to the supporting-wire and separated in a horizontal plane at a distance substantially agreeing with the diameter of the wire of the spring, a device contacting with and engaging the respective crossing wires, occupying a position within the smaller convolution of the spring, and of a diameter substantially agreeing with the inner diameter of the smaller convolution of the spring, and which device said convolution surrounds and is brought into forceful and frictional contact with and between the supporting and crossing wires to hold the said parts in a fixed relation, substantially as specified.

4. In spring-supports for upholstery, the combination with the inverted conical or spiral springs, and a supporting-wire, of a crossing wire at right angles to the supporting-wire, a clip or key-block occupying a position between said crossing wires and against the surfaces of which said wires contact, means for holding the said wires firmly to said block, said block being of a diameter substantially agreeing with the inner diameter of the smaller convolution of the spring, and of a thickness substantially agreeing with the thickness of the wire of the spring and with which block and crossing wires the said convolution is connected by screwing the same around said block and between the diameters of the crossing wires, substantially as set forth.

5. In spring-supports for upholstery, the combination with springs of inverted conical or spiral form, of supporting and crossing wires at right angles to one another, clip or key-blocks each comprising a plate of metal of substantially the thickness of the wire of the spring and of a diameter substantially agreeing with the inner diameter of the smaller convolutions of the spring, lugs formed centrally and upon opposite surfaces of said clip or key-block and adapted to be bent over the respective supporting and crossing wires lying against the opposite surfaces of said block to hold said wires in a fixed relation to said block, the spring being secured by turning the lower convolutions around said block and between the upper and lower surfaces of the respective crossing wires, and in so doing compressing and putting under tension the lower convolution to forcefully and frictionally hold the base of the spring to the crossing wires and centering the same by means of said block, substantially as set forth.

6. In spring-supports for upholstery, the combination with the inverted conical or spiral springs and a supporting-wire, of a crossing wire at right angles to the supporting-wire, a clip or key-block occupying a position between said crossing wires and engaging the same and with which block and the crossing wires the smaller convolution of the spring is connected by screwing the same around the said block and between the diameters of the crossing wires, substantially as specified.

7. In spring-supports for upholstery, the combination with the inverted conical or spiral springs and a supporting-wire, of a crossing wire at right angles to the supporting-wire, and separated in a horizontal plane at a distance substantially agreeing with the diameter of the wire of the spring, a device contacting with and engaging the respective crossing wires occupying a position within the smaller convolution of the spring, and which device said convolution surrounds and is brought into forceful and frictional contact with and between the supporting and crossing wires to hold the said parts in a fixed relation, substantially as specified.

8. In spring-supports for upholstery, the combination with the inverted conical or spiral springs, a supporting-wire and an engaging part at right angles thereto, of a clip or key-block in the form of an X-plate or crossing arms, and occupying a position within the smaller convolution of the spring and with which part and the supporting-wire the smaller convolution of the spring is connected by screwing the same around the said block into forceful frictional contact with said parts under tension, substantially as specified.

9. In spring-supports for upholstery, the combination with the inverted conical or spiral springs, a supporting-wire and an engaging part at right angles thereto, of a clip or key-block in the form of an X-plate or crossing arms having integral engaging lugs and occupying a position within the smaller convolution of the spring and with which part and the supporting-wire the smaller convolution of the spring is connected by screwing the same around the said block into forceful frictional contact with said parts under tension, substantially as specified.

Signed by me this 24th day of March, 1902.

CHARLES BUSH.

Witnesses:
  DORA I. BUSH,
  A. H. F. SEEGER.